United States Patent [19]

Chahley et al.

[11] Patent Number: 4,726,063
[45] Date of Patent: Feb. 16, 1988

[54] TELEPHONE LOCK

[76] Inventors: Peter Chahley; Olga Chahley, both of 4052 Midhurst Lane, Mississauga, Ontario, Canada, L4Z 1C7

[21] Appl. No.: 803,224
[22] Filed: Dec. 2, 1985
[51] Int. Cl.$^4$ .................... H04M 1/06; H01H 9/28
[52] U.S. Cl. ..................... 379/445; 200/43.18; 379/425; 379/428
[58] Field of Search .............. 179/189 R, 178, 179; 199/161; 379/445, 448, 425, 422; 200/43.18, 43.16, 328, 43.17

[56] References Cited

U.S. PATENT DOCUMENTS

| | | | |
|---|---|---|---|
| 2,518,554 | 8/1950 | Kirby et al. | 379/450 |
| 2,659,780 | 11/1973 | Berger | 200/43.18 |
| 2,873,333 | 2/1959 | Jacaman | 200/43.18 |
| 3,069,513 | 12/1962 | Nimer | 379/445 |
| 3,124,664 | 3/1964 | Beatty | 379/445 |
| 3,823,277 | 7/1974 | Rudolph | 379/445 |
| 3,929,035 | 12/1975 | Cohn | 200/43.18 |
| 4,006,334 | 2/1977 | Robotham et al. | 200/43.17 |
| 4,147,903 | 4/1979 | Shpall | 379/447 |
| 4,379,953 | 4/1983 | Huff | 379/447 |
| 4,435,623 | 3/1984 | Valentine | 379/445 |
| 4,504,707 | 3/1985 | Ochiai | 200/328 |
| 4,536,622 | 8/1985 | Rieman | 200/328 |

OTHER PUBLICATIONS

"Kiddy-Proof Phone Guard" Ad, *Better Homes and Gardens*, Nov. 1950, p. 303.

Primary Examiner—Jin F. Ng
Assistant Examiner—Danita R. Byrd

[57] ABSTRACT

The present invention provides an automatic lock for use on a telephone, and comprising a main body for securing to the phone, a slide member slideably mounted in the main body and a spring pressuring the slide member to automatically slide to a locking position over the post of the phone when depressed by the telephone handle to the down position. The slide member is manually slideable against the pressure of the spring away from the locking position to allow upward popping of the post with the slide member being reset to return to the locking position with further depressing of the post.

8 Claims, 11 Drawing Figures

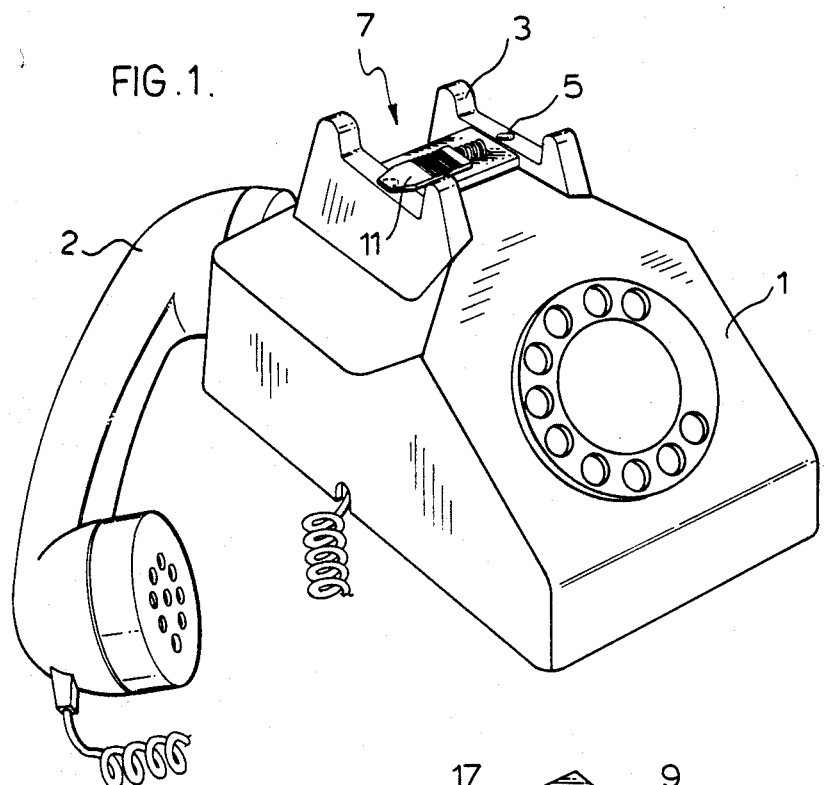
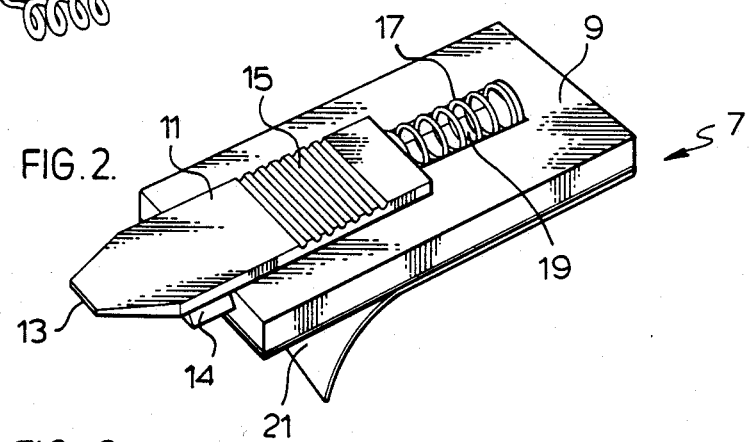
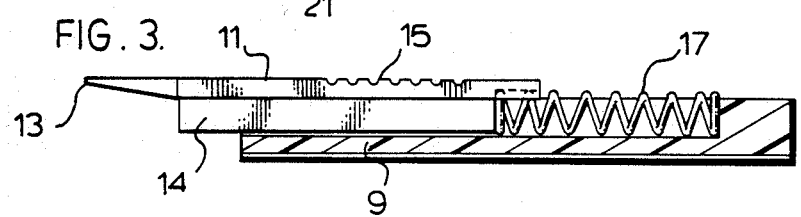

U.S. Patent  Feb. 16, 1988  Sheet 3 of 3  4,726,063
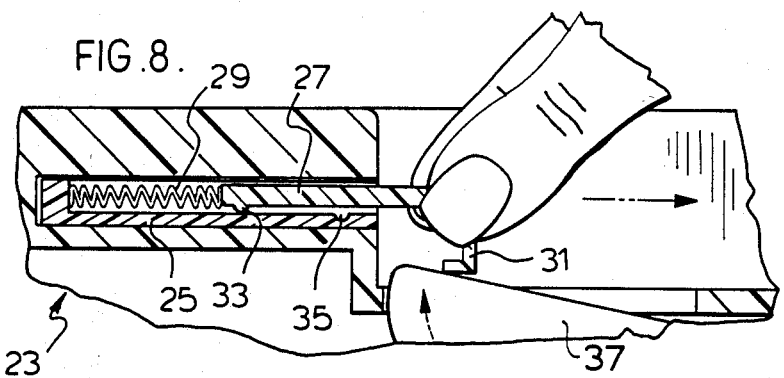
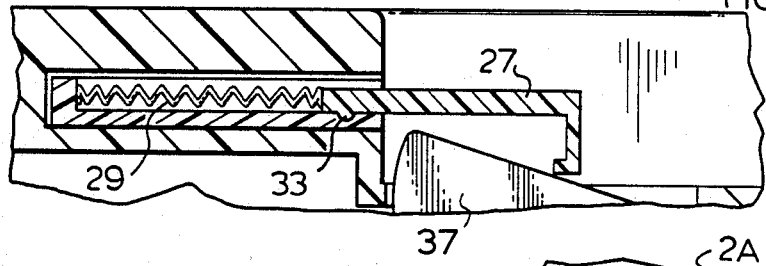
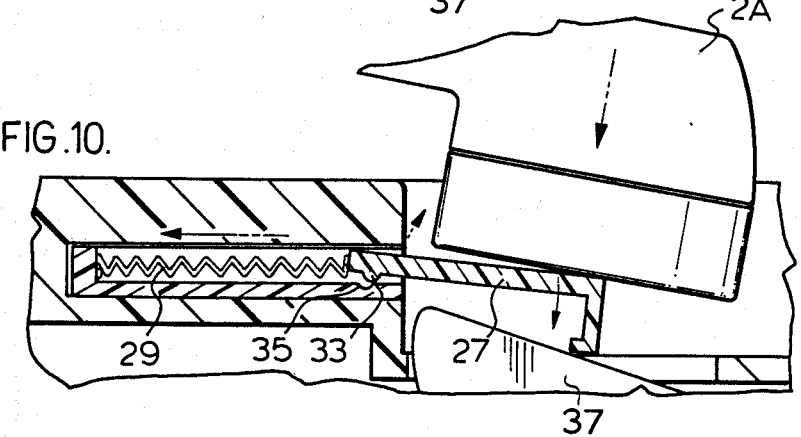
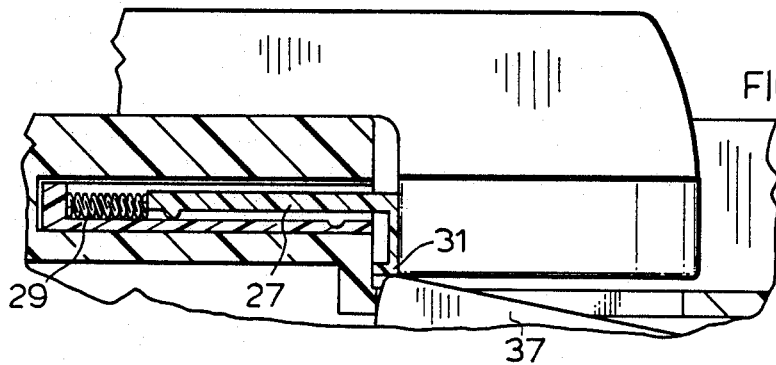

TELEPHONE LOCK

FIELD OF THE INVENTION

The present invention relates to a lock for use in holding down the post of a telephone after the handset portion has been lifted from the phone.

BACKGROUND OF THE INVENTION

As almost all parents will appreciate, young children seem to have a fascination for playing with telephones which often results in the handset of the phone being removed so that the phone is in effect in a constant busy condition, tying up the phone line. In most cases the parents aren't aware of the the condition.

Young children also have a tendency to play with the dial on the phone and actually inadvertently and undesirable place calls including long distance telephone calls from the phone.

A number of prior patents have delt with this very problem. For example U.S. Pat. No. 4,435,623 issued Mar. 6th, 1984 to Valentine describes a telephone guard device, including sliding guard members to either side of the device to block the switch hook buttons on a phone in the down position. A somewhat similar device is described in U.S. Pat. No. 3,124,664 issued Mar. 10th, 1984 to Beatty, and a further device is described in U.S. Pat. No. 3,069,513 issued Dec. 18th, 1962 to Nimer.

The problem with the structures in the first two patents referred to above is that they require manual settings to the blocking position and if they are not manually set then they are not operative. The latter of the three patents described above to Nimer does show a structure with an automatic setting. However, not only is the Nimer structure quite cumbersome but in addition, the Nimer blocking member is biased away from a blocking position so that should his device fail or if the child tampers with the device it will automatically move away from the blocking position again rendering the Nimer structure inoperative.

U.S. Pat. Nos. 3,624,317 issued Nov. 30th, 1971 to Mikco Development Company Inc. and 3,723,671 issued Mar. 27th, 1973 to Edelcreek describe telephone locking devices which due to their non-retractable construction, have particular application in office environments and the like for locking of a phone against unauthorized telephone calls. However, the structures of these two patents including their key lock operations would not be acceptable for home use where they would require constant removal and replacement of the structures to the phone.

SUMMARY OF THE PRESENT INVENTION

The present invention provides a telephone lock which is automatic in operation to ensure that it assumes a locking position after each an every use of the telephone and which is easily operated by a grown up to move away from the locking position readily enabling use of the phone when desired.

More particularly the automatic lock of the present invention which is for use on a telephone having a free handset and a pop up post depressable to a down position comprises a main body for securing to the telephone, a slide member slideably mounted in the main body and spring means pressuring the slide member to automatically slide to a locking position over the post when depressed by the handset to the down position. The slide member is then manually slideable against the pressure of the spring means away from the locking position to allow upward popping of the post with the slide member being reset to return to the locking position with further depressing of the post.

In contrast to any of the prior art patents reported above the lock of the present invention is biased to rather than away from a locking position making it much less likely that a young child will inadvertently render the lock inoperative. Furthermore, the spring pressure on the lock can be set so as to make it essentially impossible for a very young child to move the slide member away from the locking position.

BRIEF DISCUSSION OF THE DRAWINGS

The above, as well as other advantages and features of the present invention will be described in greater detail according to the preferred embodiments in which:

FIG. 1 is a perspective view of a cradle type telephone provided with a telephone lock according to a preferred embodiment of the present invention;

FIG. 2 is a top perspective view of the telephone lock secured to the telephone of FIG. 1;

FIG. 3 is a side sectional view of the lock of FIG. 2;

FIGS. 8 through 11 are side sectional views of a further telephone lock in various stages of operation according to a further preferred embodiment of the present invention.

Figure 4:
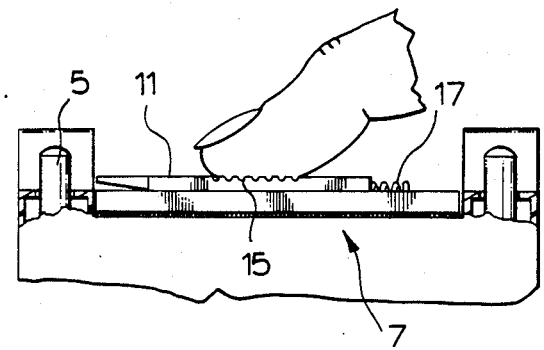
FIGS. 4 through 7 show in sequence various stages of operation of the telephone and lock of FIG. 1.

DETAILED DESCRIPTION ACCORDING TO THE PREFERRED EMBODIMENTS OF THE PRESENT INVENTION

FIG. 1 shows what is commonly known as a cradle type telephone indicated at 1. This phone includes a handset portion 2, a cradle region 3 for receiving the handset portion and a pair of pop up posts 5 only one of which can be seen in FIG. 1. As will be well understood in the art and without the lock of the present invention posts 5 automatically pop to an up position upon removing handset 2 from the telephone. As described above young children will often play with the handset permitting them to make unauthorized calls or otherwise tying up the telephone line.

FIG. 2 shows a preferred embodiment telephone lock generally indicated a 7. This telephone lock comprises a main body 9 having a self adhering bottom 21 for locating and securing the telephone lock in the cradle region of the phone. As will be seen in FIG. 1 body 9 is also dimensioned to provide an extremely tight friction fit in the cradle region of the phone further enhancing the securing of the telephone lock.

Slideably mounted in the main body of the lock is a slide member 11 having a lower undercut portion 14, fitted within a slide channel 19 of body 9. Also mounted in the slide channel is a coil spring 17 trapped between the inner end of the slide member and the end of the channel in the main body of the lock. Provided on top of the slide member is a roughened gripping surface 15 with the slide member further being provided with a cam shaped outer end 13.

The operation of the device as shown in FIGS. 1 and 4 through 7, is simple yet extremely effective for child proofing of the phone.

More particularly FIG. 1 shows the lock in a locking position where slide member 11 is located over one of the phone posts in the down position so that even should a child remove the handset of the phone the child cannot dial out on the phone and does not tie the phone up with a busy signal.

Figure 5:
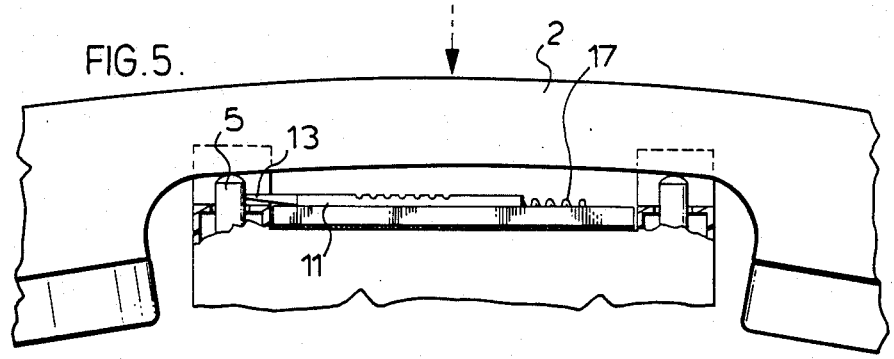

In order to render the phone operative to place an outgoing call one simply places his or her finger on the roughened region 15 of slide member 11 to retract the slide member and pull it inwardly away from the locking position thereby allowing post 5 to pop to an up position. Once the posts have assumed the up position the slide member can be released whereby the tension on the spring forces the slide member to drive back against the side of the post as shown in FIG. 5 where it is automatically reset to return to the locking position. However, as long as the post remains in the up position the slide member is blocked against travelling the full distance to the slide position where as stated above it bears against the side of the post.

Figure 6:
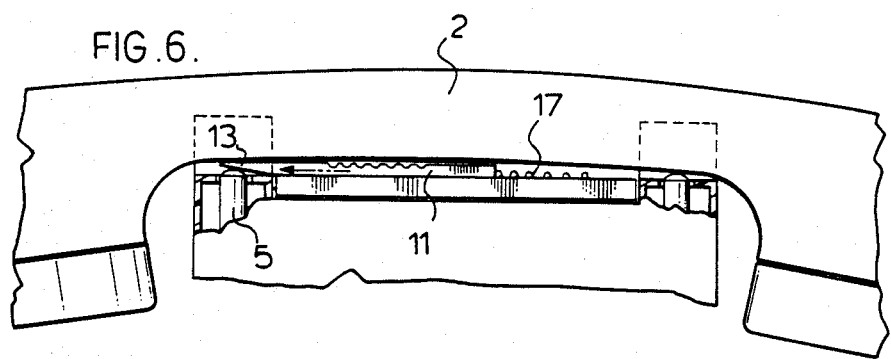
Figure 7:
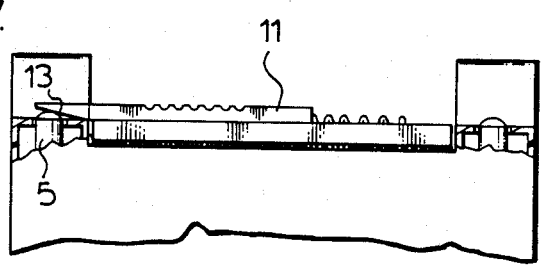

FIG. 6 shows the operation of the lock once the handset has been rested in the cradle region of the phone whereby slide bar 11 and more particularily the cammed outer end of 13 the slide bar wedges between the handset and the post which has already been moved to the depressed position by the weight of the handset. This insures that the lock moves to the locking position after each use of the phone without having to manually set the lock. However as will be appreciated the posts can be finger pressed to the down position without using the handset again resulting in an automatic movement of the slide bar to the locking position of FIGS. 1 and 7 where the posts remain locked in the down position.

FIGS. 1 through 7 show the operation of the lock device such that the slide bar slides outwardly of the main body to move to the locking position. FIGS. 8 through 11 show a modification of the lock for use on a different style of telephone which requires an outward pulling of the slide bar to the unlocking position and an inward retracting of the slide bar relative to the main body to the locking position.

More particularly FIGS. 8 through 11 show a telephone lock generally indicated at 23 for use on a telephone having a post as shown. In this arrangement the telephone lock includes a main body 25 which is mounted in a recess region of the body of the telephone as shown in the drawings. Also provided in the telephone lock is a slide member 27 with a spring 29 being attached between the main body and the slide member of the lock. The spring resists outward pulling of the slide member so that the lock is normally biased to the FIG. 11 position where it will be seen that the downward extension outer edge portion 31 of the slide member sits atop and holds the post in the down position. In order to make use of the telephone for placing a call one simply grips the side edges of the slide member as shown in FIG. 8 and pulls the slide member outwardly allowing the posts to pop up. However, in many instances the post itself will have an inclined surface and there is nothing for the slide member to bear against to hold it in the unlocked position. Therefore as shown in FIG. 9 accordingly the telephone lock itself is provided with an anti-lock feature comprising a male/female interlock including a small bar or stud 33 on the base of the slide member and a small groove 35 in the main body of the lock into which stud 33 drops when the slide member is pulled outwardly to the FIG. 9 position. With this male/female anti-lock in effect the post will remain in the up position allowing use of the phone.

FIG. 10 on the other hand shows the release of the anti-lock feature by simply placing the handle or handset 2a down onto the phone in its cradle region. Here it will be seen that slide bar 27 has a tilt action caused by the weight of the handset popping stud 33 out of groove 35 and allowing spring 29 to retract the slide member inwardly of the main body of the lock to the locking position as shown in FIG. 11. Therefore, once again the operation of the lock device is automatically affected by simply placing the handset back onto the phone, without having to manually set the lock.

Although various perferred embodiments of the invention have been described herein in detail it would be appreciated by those skilled in the art that variations may be made thereto without departing from the spirit of the invention or the scope of the appended claims.

The embodiments of the invention in which an exclusive property or privilege claimed are defined as follows:

1. An automatic lock for use on a telephone having a handset and a pop up post depressable to a down position by placing the handset on the post, said lock comprising a main body for securing to the telephone, a slide member slidably mounted on said body and spring means pressuring said slide member to automatically slide to a locking position over the post only when the post is depressed by the handset to the down position, said slide member being manually slideable away from the locking position to allow the post to pop up with said spring means biasing said slide member to return to the locking position.

2. An automatic lock as claimed in claim 1 wherein said slide member slides outwardly relative to said main body to move to the locking position.

3. An automatic lock as claimed in claim 1 wherein said slide member retracts into said main body to move to the locking position.

4. An automatic lock as claimed in claims 2 or 3 wherein said spring means comprises a coil spring.

5. An automatic lock as claimed in claims 1 or 2 wherein said slide member includes a cammed outer end for wedging between the handset and the post.

6. An automatic lock as claimed in claim 1 including a roughened gripping region on said slide member for gripping thereof to manually move away from the locking position.

7. An automatic lock as claimed in claim 1 including anti-lock means comprising a male/female interlock between said main body and said slide member, said slide member having a tilt action relative to said main body to automatically release said interlock by pushing down on said slide member.

8. An automatic lock as claimed in claim 3 wherein said slide member has a downward extension outer end portion for holding the post in the down position.

* * * * *